July 23, 1957 E. R. STANDFUSS 2,800,340
COUPLING DEVICE OF THE CONDITION RESPONSIVE TYPE
Filed Aug. 18, 1952 3 Sheets-Sheet 1

INVENTOR.
E. R. Standfuss
BY Robb & Robb
Attorneys

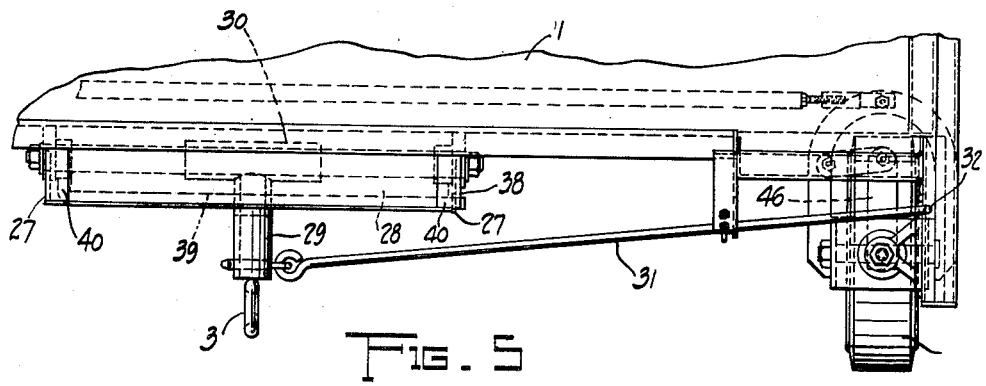
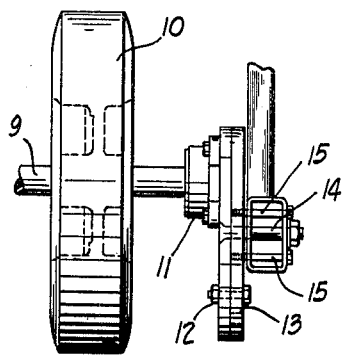
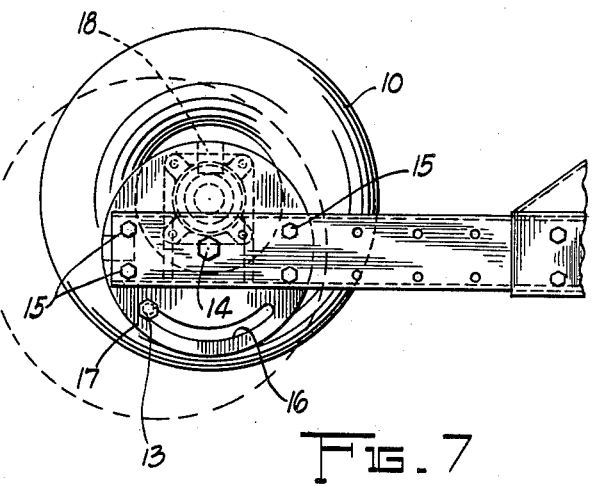
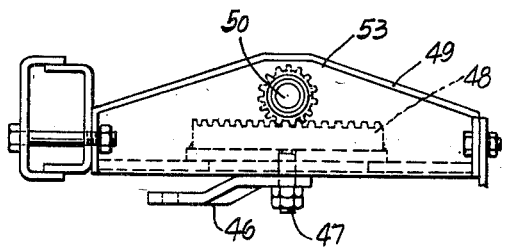
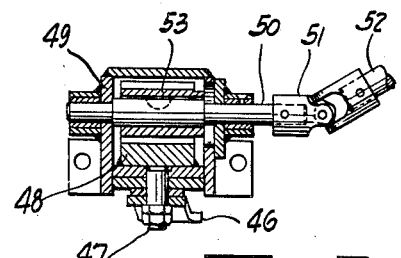

United States Patent Office 2,800,340
Patented July 23, 1957

2,800,340

COUPLING DEVICE OF THE CONDITION RESPONSIVE TYPE

Ernest R. Standfuss, Bucyrus, Ohio, assignor to The Burch Corporation, Crestline, Ohio, a corporation Application August 18, 1952, Serial No. 304,953

1 Claim. (Cl. 280—447)

This invention relates to the art of paving roads and streets and comprises a spreading machine designed primarily for depositing bituminous material forming the body of the pavement, in a layer of predetermined thickness insident to the travel of the machine over the subgrade on which the pavement is to be laid.

The spreading machine of this invention is of that type in which a suitable hopper is employed, the same being mounted upon supporting and travel wheels and adapted to be towed behind a truck, usually of the dump type, which truck supplies the material to the spreader box or hopper from which the material is fed to the surface on which it is to be laid, the material being struck off by means of a levelling strike-off blade such as commonly employed in the art.

Heretofore in machines of the general type of this invention, the dump truck is hitched to the spreading machine by means of some special construction of truck hitch for fastening and pulling the spreading unit slowly forward as the dump truck moves slowly forward and deposits its load in the hopper of the spreading unit.

One of the essential objects of my present invention has been to do away with the necessity of requiring a special form of truck hitch upon the truck for the purpose above last referred to, and with this in view, there is employed in conjunction with and mounted upon the spreader unit of the invention, a special type of draft or pulling hook which can be hooked over any convenient shackle, bar, clevis or similar part on the back of the dump truck. By reason of the use of the special form of draft hook on the spreading unit of the invention, the necessity for fairly accurate spotting of the truck in relation to the center of the spreader, is done away with. In the carrying out of this invention, the draft hook utilized is movably mounted upon the spreader unit, and can be readily shifted in a transverse direction to adjust the same in relation to the dump truck, and particularly to the part of the latter with which the draft hook is to be connected, suitable special handle means being employed for manipulation of the draft hook to adjust the position of the same transversely of the front end of the spreading unit. This, as previously indicated, does away with the need for the accurate spotting of the truck in relation to the front portion of the spreading machine.

Another feature of the invention lies in the special operating means that are employed for the actuation of the draft or pulling hook in adjusting the position of the same in establishing its connection with the part of the truck availed of for the pulling of the spreading machine. In other words, according to this invention, there are employed a manual means for operating the draft or pulling hook, extending to one side of the spreading unit, whereby an operator standing at the side of the latter may handle the operation of connecting the draft hook with the dump truck without having to step between the truck and the spreading unit with the likelihood of being injured should the truck be inadvertently backed toward the spreading machine in the connecting up or hitching operation, while the operator is between the two machines.

It is notable that in relation to the special form of draft or pulling hook employed for my spreading unit, when the truck and spreading unit are traveling around curves, the pulling hook is adapted to automatically slide along its supporting or anchor bar for enabling the curves to be easily and evenly negotiated, without any material changing of the relation of the dump truck to the spreading unit so far as relative transverse bodily movement of these units are concerned. In the conventional truck hitch commonly used today for hitching a dump truck to a spreading machine, there is afforded no allowance whatsoever for such sliding motion as above referred to, since the spreading unit is fastened more or less rigidly by the conventional hitch, to the dump truck, and thus the whole spreader has to be pulled sidewise when negotiating a curve, something that is avoided in the operation of the present invention.

It has been stated that in the use of the construction of the spreading machine of this invention, there is employed a customary type of vertically adjustable strike-off blade. According to the invention, suitable adjusting screws or lifting screws are utilized for raising and lowering the strike-off blade to position the same between its maximum and minimum positions of vertical adjustment. It is contemplated as a special feature of this invention that auxiliary means be utilized for the adjustment of the strike-off blade when the latter is to be located a greater distance from the ground level than is obtainable by adjustment of the lifting or adjusting screws connected with said blade. With the above in view, my present invention affords certain provisions involving adjustable mounting means for the axle of the rear wheels of the spreading unit, whereby said wheels may be lowered in order to elevate the spreading hopper and thereby, the strike off blade mounted thereon, if a higher elevation of the strike-off is required than would be obtainable by the adjustment of the lifting screws. The last means above referred to comprises certain eccentric supporting devices for carrying the rear axle and the supporting means thereon by which the adjustment of said axle up and down may be obtained to vary the position of the supporting rear wheels for the end above outlined.

Another feature of improvement of the present invention lies in that the employment of special supporting arms at opposite sides of the spreader box or hopper, on which the rear wheels of the machine are mounted, these supporting arms being comprised of adjustable sections or members suitably secured together to enable elongation or shortening of the lengths of said supporting arms, whereby to change the wheel base of the unit. By shortening the said wheel supporting arms, the use of the machine in close quarters may be facilitated in a manner which will more fully appear upon reference to the following description.

My invention also involves certain other details of specific construction of the machine hereinafter described, as will be more fully pointed out later herein.

For a full understanding of the present invention, reference may be had to the following description, particularly in conjunction with the annexed drawings, and in the said drawings:

Figure 1 is a general perspective view showing a spreading machine embodying the invention, looking toward same from the rear thereof.

Figure 2 is a view similar to Figure 1 but viewing the machine from the front end and merely bringing out the mounting of the draft or pull hook for its transverse sliding and up and down movements; also the manual means for shifting the said hook transversely of the machine and the lifting means beneath the hook controlling the raising and lowering of same, also operable from one side of the machine along with the manual means above referred to.

Figure 3 is a vertical longitudinal sectional view showing more particularly the general form of the spreader hopper, disposition of the draft or pulling hook when it is raised to its approximate coupling position, one of the front steering wheels, and the manual means for elevating and lowering the said hook, the hook being shown in an upraised operative position in full lines along with its actuating parts, and illustrated in dotted lines in a downward inactive position as when out of use, along with the operating parts when the hook is in its latter adjustment. In this view, the rear end portion of the machine is broken away.

Figure 5 is a fragmentary front elevation view bringing out a little more clearly the mounting means for the pulling hook and certain of the actuating means therefor.

Figure 6 is a fragmentary view in front elevation, partly broken away, and illustrating one of the eccentric adjusting units carried by the supporting arms for the rear axle and wheels of the machine, by which eccentric units said axle and wheels may be lowered in order to increase the elevation of the spreading hopper, an adjustment availed of for increasing the distance between the strike off portion of the strike-off blade and the ground and which also may be availed of to generally increase the height of the main body parts of the machine for facilitating the travel of the machine at higher speeds along roads when going from place to place of operation.

Figure 7 is a fragmentary view in side elevation, showing primarily the parts that are illustrated in Figure 6.

Figure 8 is a detailed view, bringing out more clearly the operating means between the wheel shaft of the steering wheel and the front wheels of the spreading machine, by which the latter is steered.

Figure 9 is another detailed view, showing the steering wheel shaft broken away and a short actuating shaft connected thereto by universal joint which short shaft carries the pinion which operates the shifting rack for the shifting of the front steering wheels in the steering operation, the view being a detailed sectional view taken on the line 9—9 of Figure 8.

Figure 1:
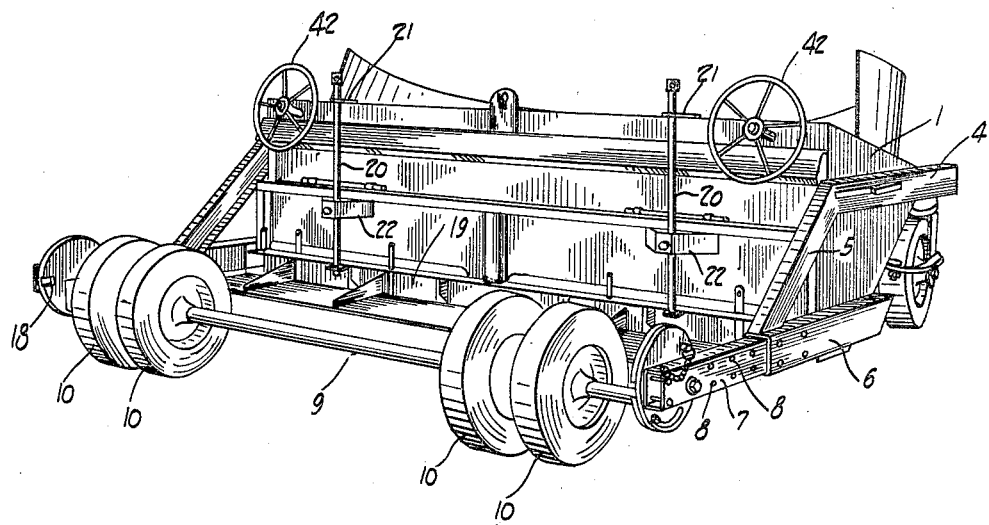
Figure 2:
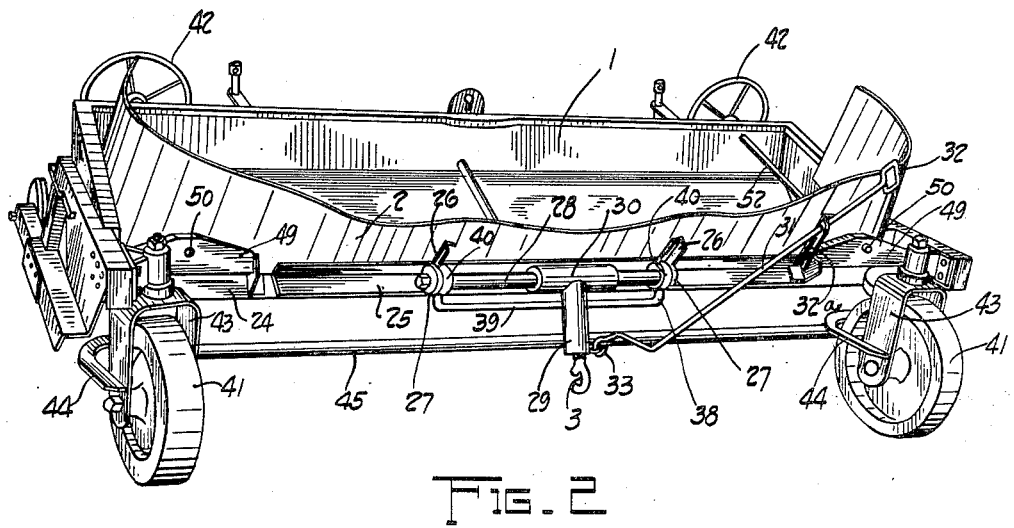

Referring primarily to Figures 1 and 2 of the drawings, it will be observed that my spreading unit or machine comprises a main hopper or body 1, into which the material to be spread by means of the machine is dumped from the dump truck which will be located in front of said hopper, and attached to the spreading unit by means of the self adjusting hook 3 shown in Figure 2, to be more fully described later herein.

At the front side of the hopper 1, the same is equipped with an apron member 2 for facilitating the direction of the material falling from the dump truck in front of the hopper into the body of the latter, as the truck and the spreading machine move forward.

At the opposite sides of the machine and adjacent to the ends of the hopper 1, are suitable frame members including the upper horizontal members 4, the downwardly and rearwardly inclined members 5, and the lower horizontal beams or members comprised of telescoping channels 6 and 7, the beam or channel 6 being rigidly attached to the adjacent end of the hopper 1 and the mating beam or channel 7 telescoping within the member 6 and being adjustable in relation to the latter and held in place by suitable bolts that may be passed through a series of pairs of openings provided in the member 7. A set of the frame members 4, 5, 6 and 7 will of course be located at each end of the hopper 1, and the openings in the member 7 above referred to are designated at 8.

The mounting of the rear axle and wheels of the spreading unit is especially novel and important to the invention. The mounting means are illustrated best in Figures 1, 6 and 7 and describing the same specifically, it is notable that the rear axle designated 9, supports the rubber tired wheels 10. At the opposite ends thereof, the axle 9 is mounted in suitable bearings 11 which bearings are carried on the inner sides of rotatably adjustable discs 12, the bearings 11 being located eccentrically on said discs 12. Each of the discs 12 is attached to an associated outer disc 13, by means of a concentrically located bolt 14 which bolt passes through the rear end portion of the telescoping frame member or arm 7, adjacent to said disc 13 and on the outer side of the latter. The disc 13 is rigidly secured to the arm 7, which previously has been described to be adjustable on the frame and in the frame member 6. For the rigid attachment of the parts 7 and 13 together, a plurality of suitable bolts 15 may be used as seen best in Figures 6 and 7 of the drawings. In the lower portion of the disc 13 of each of the eccentric mounting units at the ends of the axle 9, is provided an arcuate slot 16 and a suitable adjusting bolt 17 passes through this slot and also passes through the disc 12 whereby to hold the two discs at a relatively set adjustment, once the latter is obtained by relative movement of said discs 12 and 13.

Now it will be apparent that by the employment of the eccentric units comprising the eccentrically mounted discs 12 which carry the opposite ends of the rear axle 9, in order to raise or to lower the axle 9, it is only necessary to adjust the bolts 17 for release action, and to turn the discs 12 relatively to the discs 13 to accomplish the elevating or lowering movement of the entire rear axle unit including the axle 9 and the wheels 10.

For facilitating the turning of the discs 12, there may be provided in the peripheral portion of the latter, one or more relatively deep notches 18 into which the end of a bar may be introduced, the bar to be employed as a lever for rotating each disc 12 the same degree of movement for a setting adjustment of the axle 9 and rear wheels 10. When the discs 12 are rotated relatively to the discs 13, the proper and co-related distances required for the desired adjustment of the parts 9 and 10, the bolts 17 will be tightened up in order to maintain the discs 12 and 13 stationary relatively to each other and thereby hold the rear axle and wheel unit in its proper adjusted position, and correspondingly the entire rear portion of the spreading unit afforded by said rear wheels.

As seen best in Figure 1 of the drawings, at the rear of the spreading hopper 1 and just in rear of the lower open end of said hopper, is mounted the strike-off blade 19. This strike-off blade is adapted to be vertically adjusted on the back of the hopper by means of the adjusting or lifting screws 20, which may be turned by any convenient tool or may be provided at their upper ends with openings through which a pin bar may be passed for facilitating the rotation of these screws and thereby the proper adjusting movement of the spreader to the position in which it is desired to be used. Screws 20 pass through plates 21 at the top of the spreader box or hopper 1, and also through arms 22 provided on the back of said hopper near the opposite ends thereof.

It will be apparent from the foregoing that by reason of the employment of the eccentric adjusting means for the rear axle 9 and wheels 10 thereon, the rear portion of the hopper 1 may be raised and lowered and in the event that an elevating or raising of the strike off blade 19 is desired, greater than may be obtained by the use of the adjusting screws 20, the eccentric units may be resorted to to accomplish an additional elevating adjustment of the strike-off blade in an obvious manner. Also under certain conditions, of course, it might be desirable to elevate the strike off as high as possible from the ground level so as to obviate any likelihood of the same striking obstructions during the travel movement of the spreading machine when transported from one place to another relatively long distances. Therefore, the eccentric units at the opposite ends of the rear axle shaft may be utilized for such purposes in a manner that is also obvious.

Figure 4:
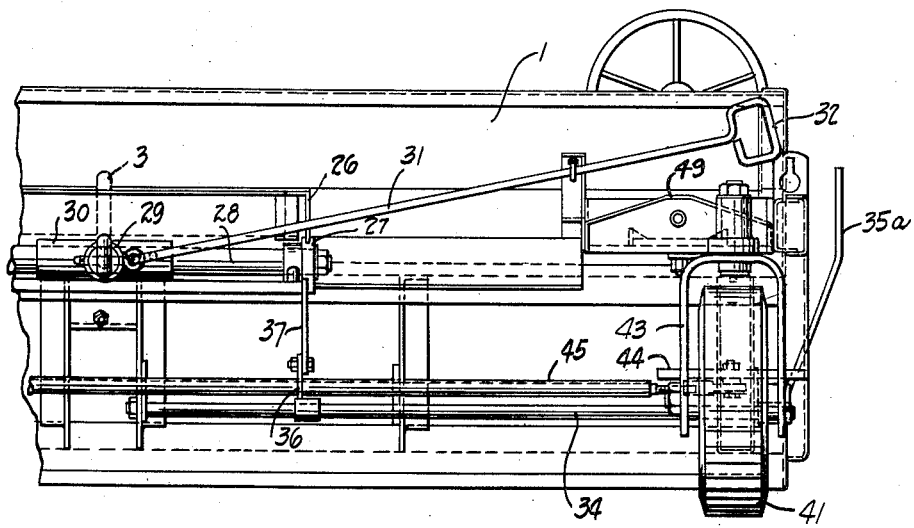
Figure 4 is a fragmentary view illustrating somewhat more than half of the machine, looking toward the front thereof and bringing out primarily the plurality of manual operating devices for the draft hook.

As seen best in Figure 2 of the drawings, and in Figure 4, in front of the hopper 1 and its apron 2, there is located a cross beam or member 24 on the middle portion of which is mounted and attached an angle plate 25 rigid therewith, bracing angles 26 extending upwardly from the plate 25 and being welded or otherwise secured to the apron member 2 for bracing the latter.

On the middle portion of the angle plate 25 are rigidly carried a pair of bearing lugs 27 for supporting the pulling hook shaft 28, on which shaft the pulling hook 3 is carried. The hook 3 is located at the outer end of the hook supporting arm 29 which is formed at its inner end with a somewhat elongated sleeve 30 and said sleeve receives the shaft 28 that forms the pivotal support for the hook 3. Also the sleeve 30 is adapted to slide freely longitudinally of the shaft 28 for the required shifting movement transversely and adjusts itself of the machine for carrying out previously stated objectives of the invention. This shifting movement of the hook transversely of the machine may be accomplished automatically incident to relative transverse shifting movement between the dump truck and the spreading unit or machine, but under certain conditions it is desirable, when connecting up the dump truck, to the spreading unit or machine, that the hook 3 shall be shifted manually by operation from one end of the spreading hopper, and without necessitating that the person operating the hook in the above manner move between the truck and the hopper where he might be accidentally injured when the truck is backed up for hitching connection with the spreading unit. For the last mentioned purpose, therefore, I provide a hand operated rod 31 having the handle 32 accessible to and operable by a person at the right hand end of the spreading unit as seen in Figure 2, which rod 31 is connected in a pivotal manner at its inner end as at 33 to an eye offstanding from the front end of the hook arm 29. The rod 31 is guided in its movement by mounting means comprising a guide bracket 32a on the front side of the apron 2, near the handle end of the rod 31. By pushing or pulling on the handle 32, the shifting of the hook 3 longitudinally on the shaft 28 may be readily achieved as obvious.

Figure 3:
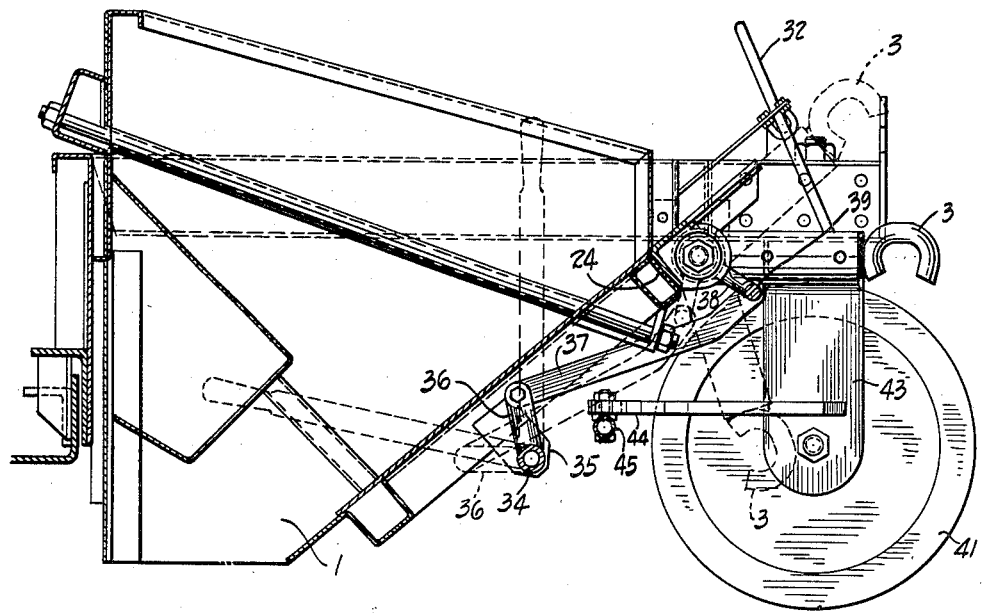

In addition to the foregoing operating means for the hook 3, I provide manual actuating devices for raising and lowering the hook 3 by upward and downward swinging movement respectively, such means being illustrated best in Figures 3 and 4 of the drawings as comprising a shaft 34 supported for rotation in suitable brackets on the front portion of the hopper 1, the brackets being designated 35. On the end of the shaft 34 which extends from the side of the spreading machine near the end at which the handle 32 of the rod 31 is located, is mounted a manually operable lever 35a which is keyed or otherwise attached rigidly to the shaft 34 for rotating the latter. On the shaft 34 near its innermost end is carried an arm 36 which is keyed to the shaft to turn therewith, and said arm 36 is connected by means of a link 37 with an arm 38 which is rigidly attached to the adjacent or one end, of a lifting bail which is adapted to freely swing on the hook supporting shaft 28. The lifting bail is designated 39 and has end bearing members 40 provided with bearing openings that receive the ends of the shaft 28. The bearing members 40 are located at the inner sides of and closely proximate to the supporting bearing lugs 27 previously referred to as carrying the shaft 28.

Now it will be seen that with the parts of the draft hook mechanism disposed as shown in Figure 3 with the draft hook in full lines in its operative connecting position for engagement with the part of the truck by which the spreading machine is to be pulled, that by manually operating the lever 35a to shift the same downwardly from the vertical dotted line position illustrated in Figure 3 to the nearly horizontal dotted line position of said figure, the arm 36 will be pulled rearwardly and downwardly. This will cause a pull rearwardly upon the link 37 and in consequence, will rock downwardly also the arm 38 which is attached to the bail 39. The bail 39 practically speaking, constitutes an elongated bar which operates beneath the hook arm 29 and thus when the bail bar referred to, or bail 39, is rocked downwardly, the hook 3 may move downwardly so that it may occupy the position shown in dotted line in Figure 3, as an inoperative position. Of course a reverse movement of the lever 35a will shift the link 37 in a forward direction and raise the bail or bar member 39, which engages the hook arm 29 underneath the latter, thereby elevating the hook 3 from the lower dotted line position of Figure 3 to the upper full line position thereof. The operation again of the hook 3 in the above manner is performed from one side of the spreading machine adjacent to one end of the hopper 1 thereof, and there is no necessity for the operator to enter the space between the truck and the spreading machine in the manipulation of the hook member 3 and the moving of the truck relative to said spreading machine for the hitching up operation.

The front running gear for the spreading machine as above set forth, comprises a pair of front wheels 41 of caster-like form except that the wheels are not free for turning, but are controlled by positive steering means including the steering wheels 42, one of which is mounted near each end of the spreading hopper 1. The purpose in utilizing two of the steering wheels is to enable a steering operation of the front wheels 41 to be performed by an operator who might be located at either end of the spreading hopper 1.

The wheels 41 are supported by suitable bearings in vertical turning yokes 43, having the usual type of vertical trunnions at their upper ends carried in suitable bearings on the frame portion of the spreading machine.

For effecting simultaneous movement of the wheels 41, the yokes 43 thereof are connected together by horizontal yoke members 44 suitably connected together by means of a drag-bar or link 45 as customary for the purpose.

At the top of each of the vertical yokes 43 for the wheels 41, is a rearwardly extending arm 46 constituting a steering arm, and this arm at its rear end is pivotally connected by a vertical pivot or bolt 47 with a horizontally sliding rack 48, mounted in a suitable housing 49, such parts being provided for each wheel 41, and the two housings being suitably fixed and supported by brackets on the cross-beam or member 24 and to upper horizontal member 4 previously described. In each of the housings 49 is mounted a steering pinion, meshing with the teeth of the rack 48 and keyed or otherwise attached to rotate with a short stub shaft 50 extending rearwardly from and through the housing 49 with which the shaft is associated. At its rear end, the stub shaft 50 of each housing 49 and rack 48 is attached by a universal joint 51 to the associated or adjacent steering wheel shaft 52 that carries one of the steering wheels 42.

Now it will be apparent that if either one of the steering wheels 42 is rotated, its shaft 52 and stub shaft 50 will be correspondingly rotated to turn the pinion 53 mounted or keyed on the shaft 50. This will produce a sliding movement of the rack 48 in either direction, depending on the direction of the rotation of the steering wheel 42 and thereby shift the steering arm 46 sidewardly as indicated, and thus turn the wheels 41 since a turning action of either of the wheels 41 will produce a corresponding steering movement of the other of such wheels 41.

Having thus described my invention, what I claim as new and desire to secure by Letters Patent of the United States, is:

In a spreading machine, in combination, frame means, a hopper connected thereto for holding material to be spread, supporting wheels for the hopper connected thereto, and means for connecting the front end of the machine to a dump truck comprising a draft hook, a support to which the hook is pivoted for vertical movement, and means extending to one side of the machine for raising and lowering the hook, comprising a lever pivoted to one end of the hopper, a lifting bail including a cross bar engaging the underside of the hook and linkage means connecting the lever and bail for transmitting movement of the lever to the bail and thereby actuating the bail to lift or lower the hook.

References Cited in the file of this patent

UNITED STATES PATENTS

| | | |
|---|---|---|
| 471,042 | Warren et al. | Mar. 15, 1892 |
| 1,428,903 | Porterfield | Sept. 12, 1922 |
| 1,464,446 | Schiltz | Aug. 7, 1923 |
| 1,553,570 | Strandlund | Sept. 15, 1925 |
| 1,662,257 | Valerio | Mar. 13, 1928 |
| 1,701,745 | Benjamin et al. | Feb. 12, 1929 |
| 1,840,599 | Nibbe | Jan. 12, 1932 |
| 2,119,263 | Baumgardner | May 31, 1938 |
| 2,258,205 | Halvorson | Oct. 7, 1941 |
| 2,267,022 | Gledhill | Dec. 23, 1941 |
| 2,491,963 | Fons | Dec. 20, 1949 |
| 2,500,064 | Foster | Mar. 7, 1950 |
| 2,560,908 | Thompson | July 17, 1951 |

FOREIGN PATENTS

| | | |
|---|---|---|
| 206,900 | Great Britain | Nov. 12, 1923 |